US011791702B2

(12) United States Patent
Delaisse et al.

(10) Patent No.: US 11,791,702 B2
(45) Date of Patent: Oct. 17, 2023

(54) ELECTRIC MOTOR WITH STATOR AND MOBILE ARMATURE WITH SUSPENDING LEAF SPRINGS WHICH PREVENT MOVEMENT IN TRANSVERSE DIRECTION AND IS IN AIRGAP PLANE THAT IS PERPENDICULAR TO FIRST LOOP PLANE

(71) Applicant: AMS R&D SAS, Seine Port (FR)

(72) Inventors: Guy Delaisse, Champforgeuil (FR); Jean-Baptiste Drevet, Boulogne sur Mer (FR); Harold Guillemin, Seine Port (FR)

(73) Assignee: AMS R&D SAS, Seine Port (FR)

( * ) Notice: Subject to any disclaimer, the term of this patent is extended or adjusted under 35 U.S.C. 154(b) by 490 days.

(21) Appl. No.: 16/770,332

(22) PCT Filed: Dec. 5, 2018

(86) PCT No.: PCT/EP2018/083703

§ 371 (c)(1),
(2) Date: Jun. 5, 2020

(87) PCT Pub. No.: WO2019/110694

PCT Pub. Date: Jun. 13, 2019

(65) Prior Publication Data

US 2020/0358346 A1 Nov. 12, 2020

(30) Foreign Application Priority Data

Dec. 5, 2017 (FR) ...................................... 1761677

(51) Int. Cl.

*H02K 33/04* (2006.01)
*F04B 45/047* (2006.01)

(Continued)

(52) U.S. Cl.

CPC ........... *H02K 33/04* (2013.01); *F04B 45/047* (2013.01); *H02K 33/02* (2013.01); *H02K 35/02* (2013.01)

(58) Field of Classification Search

CPC ........ H02K 41/00; H02K 41/02; H02K 33/04; H02K 33/02; H02K 35/02

(Continued)

(56) References Cited

U.S. PATENT DOCUMENTS 3,746,937 A 7/1973 Koike
4,563,603 A 1/1986 Mikiya (Continued)

FOREIGN PATENT DOCUMENTS

EP 0412856 A1 2/1991
EP 1548917 A2 6/2005

(Continued)

*Primary Examiner* — Maged M Almawri

(74) *Attorney, Agent, or Firm* — Muncy, Geissler, Olds & Lowe

(57) ABSTRACT

An electromagnetic machine includes a stator, a movable armature and a device for mechanically connecting the movable armature to the stator. The connecting device includes a plurality of leaf springs. The stator includes at least one first electrical coil and at least one first magnetic core forming at least one open loop between first and second terminal ends of said first loop in order to define an air gap between said terminal ends. The plurality of leaf springs extends on a single side of an air gap plane perpendicular to a first loop plane. The plurality of leaf springs is arranged so as to authorise the translation of the movable armature in relation to said stator in a direction that is perpendicular to the loop plane and to prohibit any movement of said movable armature in any direction within said loop plane.

24 Claims, 9 Drawing Sheets

(51) Int. Cl.
*H02K 33/02* (2006.01)
*H02K 35/02* (2006.01)

(58) Field of Classification Search
USPC ........................ 310/21–28, 36; 417/363, 354
See application file for complete search history.

(56) References Cited

U.S. PATENT DOCUMENTS 5,632,087 A * 5/1997 Motohashi ............ H02P 25/032 30/43.92
5,921,134 A * 7/1999 Shiba .................... B26B 19/282 310/20
6,405,599 B1 * 6/2002 Patt .......................... G01N 3/02 73/779
6,958,554 B2 * 10/2005 Fujiwara ................ H02K 33/02 310/36
6,991,217 B2 * 1/2006 Shimizu ................ B26B 19/288 310/12.01
7,015,602 B2 * 3/2006 Kraus ................... B26B 19/288 310/38
7,239,053 B2 * 7/2007 Brill ........................ B26B 19/06 310/36
7,304,407 B2 * 12/2007 Sanematsu ............. H02K 33/16 310/12.24
7,474,065 B2 * 1/2009 Kraus ................... H02P 25/032 318/135
7,607,229 B2 * 10/2009 Motohashi ............ B26B 19/288 30/44
7,679,229 B2 * 3/2010 Mark ...................... F16F 1/185 310/36
7,694,593 B2 * 4/2010 Owens ..................... G01N 3/32 73/865.6
8,373,315 B2 * 2/2013 Kobayashi ............. H02K 33/16 310/25
8,610,329 B2 * 12/2013 Schwer .................. H02K 33/04 30/208
9,496,778 B2 * 11/2016 Andrikowich ........... H02K 5/04
10,476,364 B2 * 11/2019 Zhang .................. H02K 41/031
10,792,825 B2 * 10/2020 Kraus ................... B26B 19/282
10,864,644 B2 * 12/2020 Kraus ................... B26B 19/288
10,913,171 B2 * 2/2021 Kraus .................... H02K 33/00
11,052,553 B2 * 7/2021 Murakami ............... H02K 7/04
11,167,436 B2 * 11/2021 Kraus ................ H02K 11/0141
11,646,650 B2 * 5/2023 Li .......................... H02K 7/145 310/20
2003/0094861 A1 * 5/2003 Shimizu ................. H02K 33/10 310/36
2008/0267797 A1 * 10/2008 Hell ...................... F04B 35/045 417/415

FOREIGN PATENT DOCUMENTS

JP 2012-070578 A 4/2012
JP 2014-147248 A 8/2014

* cited by examiner

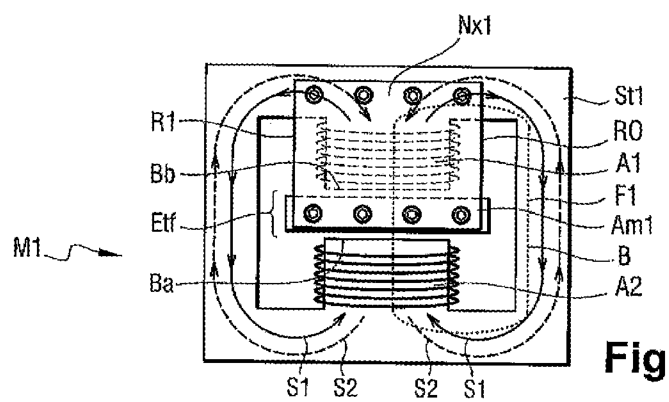
Fig. 3a
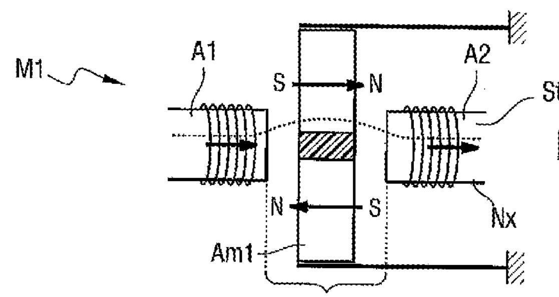
Fig. 3b1
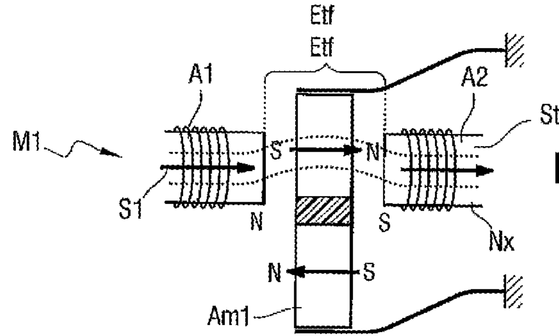
Fig. 3b2
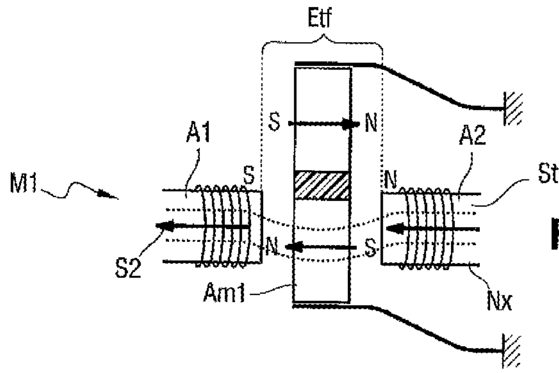
Fig. 3b3

ELECTRIC MOTOR WITH STATOR AND MOBILE ARMATURE WITH SUSPENDING LEAF SPRINGS WHICH PREVENT MOVEMENT IN TRANSVERSE DIRECTION AND IS IN AIRGAP PLANE THAT IS PERPENDICULAR TO FIRST LOOP PLANE

BACKGROUND OF THE INVENTION

The invention relates to the field of electromagnetic machines such as electric motors or electric generators.

An electromagnetic machine having a stator provided with a coil and an armature able to move with respect to the stator, this armature bearing permanent magnets and being guided in movement with respect to the stator by guideways and helical springs being arranged to force a return force returning the armature toward a stable position of rest relative to the stator, is known, for example from document U.S. Pat. No. 3,746,937 (A).

The efficiency of such a machine is minimized by the friction of the guideways. An electromagnetic machine is also disclosed by document EP1548917 but its stator armature has parasitic movements deemed to be undesirable for certain applications because they affect its efficiency. The electromagnetic machine of patent document U.S. Pat. No. 6,405,599 offers the advantage of reducing the parasitic movements of the mobile armature, but its energy efficiency would need to be improved.

OBJECT OF THE INVENTION

One object of the invention is to provide a resonant electromagnetic machine that limits the energy losses associated with potential friction and wearing of contacting parts as the mobile armature moves with respect to the stator.

SUMMARY OF THE INVENTION

To that end, the invention proposes an electromagnetic machine comprising a stator, a mobile armature able to move with respect to the stator and a mechanical connection device connecting the mobile armature to the stator, the connecting device comprising a plurality of leaf springs designed to suspend the mobile armature from the stator, each leaf spring comprising at least one elastic leaf that is deformable in bending, the stator comprising at least a first electric coil and at least a first magnetic core forming at least one open loop between first and second terminal ends of this first loop so as to define an air gap between these terminal ends, this first coil being arranged around a portion of the first magnetic core.

The electromagnetic machine according to the invention is essentially characterized in that said plurality of leaf springs extends on just one side of an air-gap plane, this air-gap plane being perpendicular to a first-loop plane in which this first loop extends, this air-gap plane being situated between said terminal ends of this first loop while at the same time being distant from these ends of the first loop, the mobile armature bearing permanent magnets.

The machine is further characterized in that each given leaf spring of said plurality of leaf springs extends from a first end of this given leaf spring, which end is connected (attached) to said stator, as far as a second end of this given leaf spring, which end is connected (attached) to said mobile armature, at least one of said springs of the plurality of leaf springs being on one side of said loop plane and at least another of said springs of the plurality of leaf springs being on the other side of this loop plane, the plurality of leaf springs being arranged to generate an elastic return force returning the mobile armature toward a position of rest of the armature when said armature has undergone a translational movement with respect to said stator in a direction perpendicular to the loop plane and to prevent any movement of said mobile armature in a transverse direction comprised both in the air-gap plane and in the loop plane.

The plurality of leaf springs is thus arranged to allow translational movement of the mobile armature with respect to the stator and in at least one direction perpendicular to the loop plane while at the same time generating an elastic return force returning the mobile armature toward a position of rest.

For the understanding of the invention, the position of rest of the mobile armature is the position in which this mobile armature lies when the coil(s) are not electrically powered and the mobile armature is immobile with respect to the stator.

The feature "the plurality of leaf springs being arranged to prevent any movement of said mobile armature in a direction comprised both in the air-gap plane and in the loop plane" is to be understood as meaning that the plurality of springs has:

- a first elastic stiffness to elastically oppose a movement of the mobile armature with respect to the stator in a direction perpendicular to the loop plane; and
- a second elastic stiffness, referred to as transverse stiffness, to elastically oppose the movement of the mobile armature with respect to the stator in a transverse direction comprised both in the air-gap plane and in the loop plane, this second elastic stiffness being at least 100 times higher than the first elastic stiffness and preferably at least 200 times higher than this first elastic stiffness.

Thus, the plurality of leaf springs is arranged:

- on the one hand, so that there is a first stiffness that allows a movement of the structure in a direction perpendicular to the loop plane, namely a direction extending in a plane perpendicular to the loop plane, with at least one component of movement perpendicular to the loop plane; and
- on the other hand, so that there is a second stiffness very much greater than the first stiffness that prevents the mobile armature from moving in a transverse direction.

The notion of preventing movement in the transverse direction is therefore interpreted relative to the authorization of movement in the direction of authorization of movement.

Thus, in order to move the mobile armature in the transverse direction by a given distance, a force at least 100 times higher than the force needed to move this mobile armature, over a same given distance, in a direction substantially perpendicular to the loop plane needs to be applied.

This transverse direction extends in the air-gap plane and in the loop plane.

The fact of having leaf springs extending on just one side of the air-gap plane makes it possible to limit the maximum level of mechanical tension exerted in the leaf springs as the mobile armature moves by comparison with a situation in which there were leaf springs on either side of the air-gap plane and connected on either side of the stator.

By minimizing this tension in the leaf springs:

- the energy loss associated with a tensioning of the leaf springs is limited and the energy efficiency of the electromagnetic machine is increased; and moreover the wearing of the springs is limited, thereby increasing the service life of the machine.

This first coil is arranged around a portion of the first magnetic core according to circumstances:

- so as to be able, when the electromagnetic machine is operating in motor mode, to induce a magnetic field through the air gap and move the mobile armature when this first coil is powered with a first electrical signal; or
- so as to be able, in generator mode, to generate a first electrical signal when a magnetic field passes through the air gap under the effect of the movement of the mobile armature.

Thus, the electromagnetic machine according to the invention can be an electricity generator or, for preference, an electric motor.

The invention will be described in greater detail with reference to the drawings described hereinafter.

BRIEF DESCRIPTION OF THE DRAWINGS

FIG. 3*a* is an example of a machine according to the invention comprising just two leaf springs, these two leaf springs being respectively positioned on either side of the plane P2 in which the first loop B is formed;

FIGS. 3*b*1, 3*b*2, 3*b*3 illustrate three successive states adopted by the machine according to the invention to generate an alternating movement of the armature in the air gap in one direction and then the other;

Figure 1A:
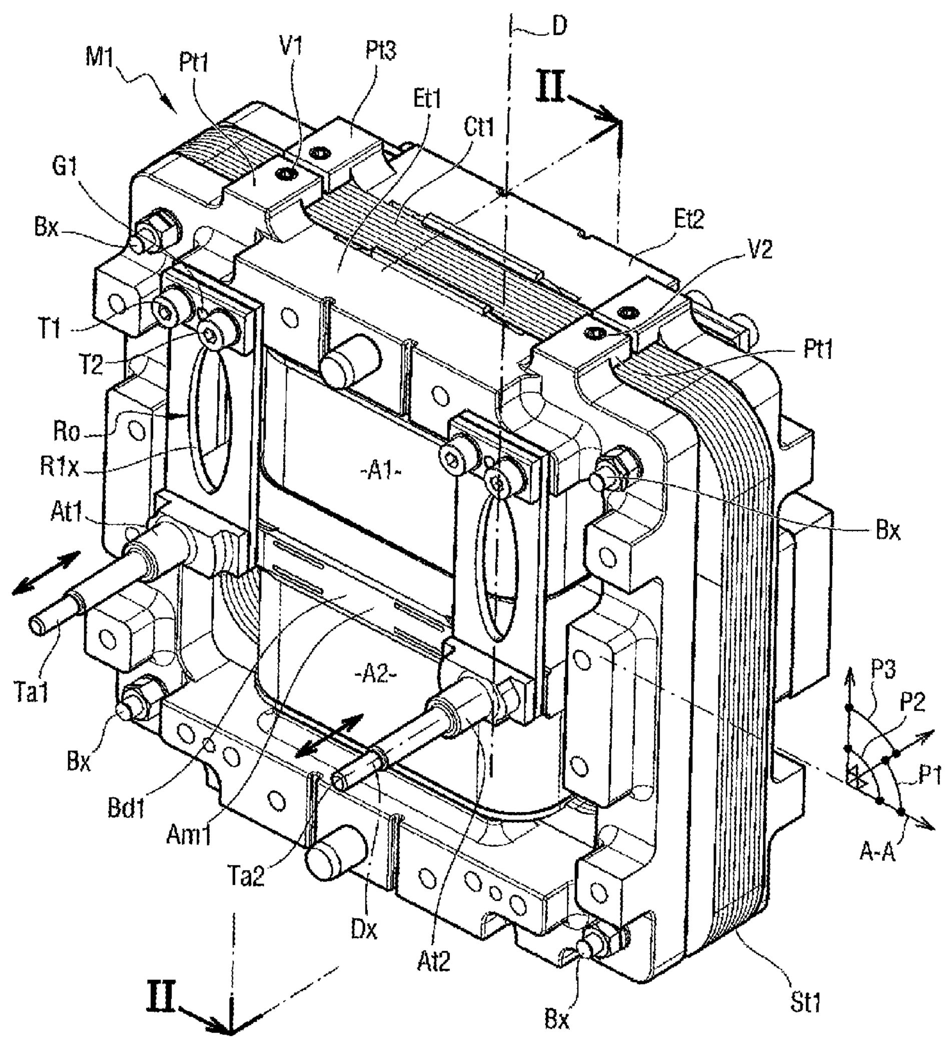
FIG. 1A is a perspective view of the electromagnetic machine according to the invention.

As indicated previously, the invention essentially relates to an electromagnetic machine M1 comprising a stator St1, a mobile armature Am1 able to move with respect to the stator and a mechanical connection device R0 connecting the mobile armature to the stator St1.

The connecting device comprises a plurality of leaf springs R1, R2, R3, R4 designed to suspend the mobile armature Am1 from the stator St1.

Each leaf spring R1, R2, R3, R4 comprises at least one elastic leaf Lm able to be deformed in bending.

The stator St1 comprises at least a first electric coil A1, in this instance two coils A1 and A2.

As can be seen for example in FIG. 3, the stator St1 also comprises at least a first magnetic core Nx1 forming at least one open loop B between first and second terminal ends Ba, Bb of this first loop B to define an air gap Etf between these terminal ends Ba, Bb.

The mobile armature Am1 is suspended via the connecting device R0 in such a way that this mobile armature Am1 is positioned between said first and second terminal ends Ba, Bb of said first open loop B. This open loop B is configured to define at least a first flux path F1 in the shape of a C, the terminal ends of this C-shape being respectively formed by the first and second terminal ends Ba, Bb of said first open loop B. The first coil A1 is arranged around a portion of the first magnetic core Nx, on one side of the air-gap plane P1, while the second coil A2 is arranged around another portion of the first magnetic core, on the other side of the air-gap plane P1.

The first coil A1, like the second coil A2, comprises several stator windings, namely several turns of a conducting material coated with a peripheral electrical insulator so that adjacent turns of the coil are separated from one another by this insulating material.

The first core forms a pole piece made of mild ferromagnetic materials referred to as a magnetic core which channels the magnetic field lines along the first open loop so that a magnetic field passes through the air gap between the terminal ends of the first loop. The magnetic field passing through the air gap is referred to as the working magnetic field.

More particularly, the first magnetic core is formed of a plurality of laminations of mild ferromagnetic materials.

The first magnetic core also forms a second open loop which extends in said first-loop plane P2. In other words, these first and second open loops each form a C, the ends of these open loops meeting to together define the air gap Etf of the stator St1.

The terminal ends of the second open loop extend on either side of said air-gap plane.

The first terminal ends of the first and second open loops meet and coincide to together define one edge of the air gap on one side of the air-gap plane P1.

Likewise, the second terminal ends of the first and second open loops meet and coincide to together define another edge of the air gap on the other side of the air-gap plane P1.

In motor mode, each of these coils may induce a magnetic field through the air gap and move the mobile armature when the coil is powered with a first electrical signal.

In generator mode, each of these coils generates a first electrical signal when a magnetic field passes through the air gap Etf under the effect of the movement of the mobile armature.

These coils are preferably mounted in series with the same direction of winding, these coils moreover being mutually identical so that the machine according to the invention behaves uniformly.

Figure 9:
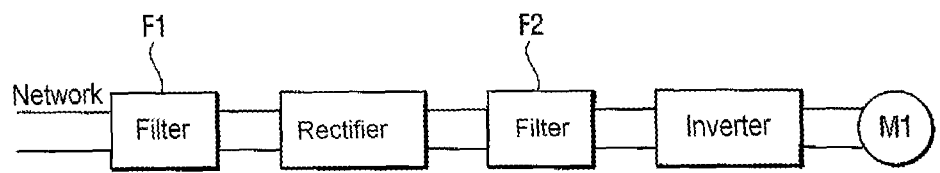
FIG. 9 illustrates a device for electrically powering an electromagnetic machine according to the invention used, for example, to drive a pump/a circulator as in FIGS. 7, 8*a*, 8*b*, this powering device comprising a power supply network at the output of which a first filter can be positioned to smooth the current (and also to limit the disturbances of the network), a current rectifier being positioned at the output of this first filter and a second filter F2 being positioned at the output of this rectifier, then an inverter being positioned between this second filter F2 and the electromagnetic machine/the motor according to the invention. In order to smooth the voltage and prevent any parasitic noise or vibration in the machine, it is also possible to install a filter downstream, between the inverter and the machine M1. Here we have an electromagnetic machine and a power supply device with chopping electronics.

In order to allow precise movement of the mobile armature Am1, a power supply is provided that has at least one inverter, possibly incorporated into a more complex power supply depicted in FIG. 9.

As illustrated with reference to FIG. 1A, the plurality of leaf springs R1, R2, R3, R4 extends on just one side of an air-gap plane P1, this air-gap plane P1 being perpendicular to a first-loop plane P2 in which this first loop B extends.

This air-gap plane P1 is situated between said terminal ends of this first loop B while at the same time being distant from these ends of the first loop B.

The mobile armature bears permanent magnets Mn1, Mn2.

The machine is further characterized in that each given leaf spring R1, R2, R3, R4 of said plurality of leaf springs R0 extends from a first end of this given leaf spring, which end is connected (attached) to said stator St1, as far as a second end of this given leaf spring, which end is connected (attached) to said mobile armature Am1.

At least one of said springs R1 of the plurality of leaf springs being on one side of said loop B plane and at least another of said springs R2 of the plurality of leaf springs being on the other side of this loop B plane.

The plurality of leaf springs is arranged to allow translational movement of the mobile armature Am1 with respect to said stator St1 in a direction Dx perpendicular to the loop plane P2 and to prevent any movement of said mobile armature Am1 in any direction comprised in this loop plane P2.

For that, the plurality of leaf springs R1, R2, R3, R4 comprises at least one leaf spring arranged on one side of the loop plane P2 and at least one leaf spring arranged on the other side of the loop plane P2 and the leaf springs of the plurality of leaf springs are exclusively arranged on just one side of the air-gap plane P1.

These leaf springs, when observed in a direction parallel to the air-gap plane P1 and to the loop plane P2, form a parallelogram of which two of the mutually parallel sides are formed by at least two leaf springs and of which the other two mutually parallel sides are formed by the mobile armature Am1 on the one hand and by an edge of the stator St1 on the other hand.

Each of the springs of the plurality of leaf springs has its first end connected to the stator St1 by a built-in connection and its second end connected to the mobile armature Am1 by a built-in connection.

Thus, as the mobile armature Am1 moves with respect to the stator St1, each leaf spring is bent at its two ends, as is illustrated in FIGS. **3*b*2, 3*b*3**.

Because of the built-in connections of each leaf spring and because of the parallelogram arrangement, the bends of the one same spring are in opposite directions from one another, one of these bends being oriented toward one of the faces of the spring while the other of the bends is oriented toward the other of these faces of the spring.

Within the limits of maximum movement of the mobile armature Am1 with respect to the stator St1, the deformation of the leaf springs is the same for all of these leaf springs. The armature thus always maintains the same orientation with respect to the stator, something which is advantageous in terms of efficiency of the motor because the respective orientations of the poles of the magnets with respect to the loop plane P2 remain constant.

One advantage of this mode of connection between the mobile armature and the stator is that it allows the use of leaf springs that are exclusively flat along their entire free lengths between the stator and the armature.

That makes it possible to reduce the side of the air gap on account of the axial stiffness of the leaf springs, this stiffness is considered to be sufficient to ensure that the stretching of the leaf springs represents less than 1 thousandth of its length when the magnets are attracted by the stator. This advantage leads to limiting of the magnetic losses in the air gap and therefore increases the overall efficiency of the system.

This also allows the design of the leaf springs to be simplified in order to optimize the use of the material with a view to obtaining the desired resonance and precisely controlling the distribution of the stresses.

The manufacture of the leaf springs is thus simplified because they can be simply flat, without undulation or rounded fixing edges.

By simplifying the springs, the characteristics of the springs can be made to be repeatable, and the mass production of these springs becomes easier.

A translational movement of the mobile armature (magnet support) with at least one predominant first component of translational movement perpendicular to the plane P2 is thus possible, all the other components of the translational movement being minimized. Each leaf spring has:

- a first bending stiffness in a favored direction of bending resulting from a stress (force) applied to the leaf spring exclusively in a direction perpendicular to the loop plane P2; and
- a second bending stiffness in an unfavorable direction of bending/preventing the bending resulting from a stress (force) exerted on the leaf spring exclusively in a direction extending in the loop plane P2 and parallel to the air-gap plane P1.

The second bending stiffness in the direction unfavorable to bending is at least 100 times higher than the first bending stiffness in the favored direction of bending and preferably 200 times higher than the first bending stiffness in the favored direction of bending.

The first stiffness corresponds to a bending stiffness of the leaf spring with respect to an axis of bending of the leaf spring extending parallel to the loop plane P2 and parallel to the air-gap plane P1.

The second stiffness corresponds to a bending stiffness of the leaf spring with respect to an axis of bending of the leaf spring extending perpendicular to the loop plane P2.

Figure 1B:
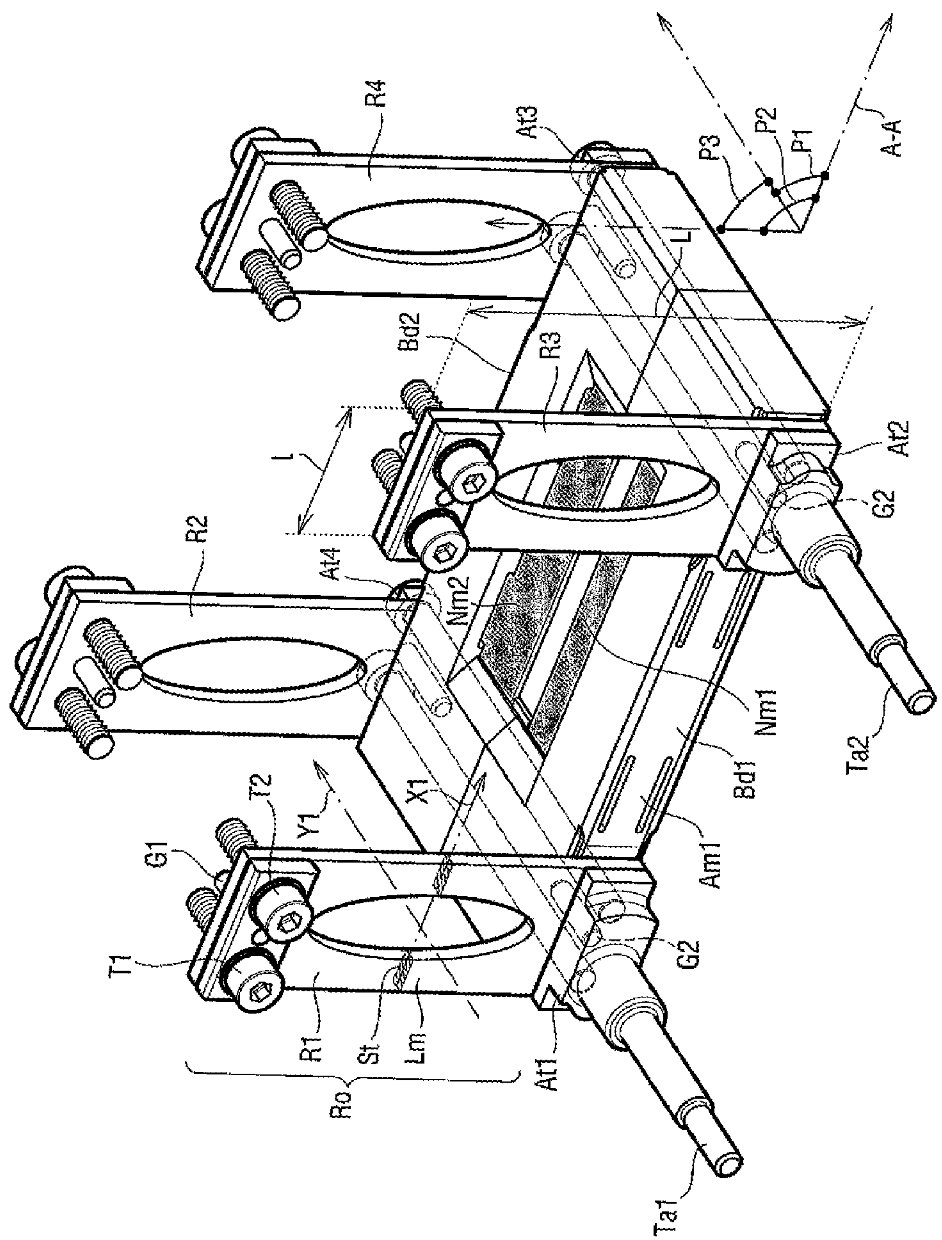
FIG. 1B is a perspective view of the mobile armature of the machine according to the invention of FIG. 1A; four mutually identical leaf springs which extend on just one side of this armature in order to support it with respect to the stator can be seen.

As illustrated in FIG. 1B, the first stiffness markedly lower than the second stiffness is obtained by virtue of the second moments of area of cross sections St of each of the leaf springs of the plurality of leaf springs.

Thus, for any cross section St of any one of the leaf springs of the plurality of leaf springs, there are:

- a second moment of area value of this leaf spring with respect to a first axis of moment X1 extending in this cross section, parallel to the loop plane P2 and parallel to the air-gap plane P1 which is at least equal to 100 times and preferably to 200 times;
- a second moment of area value of this leaf spring with respect to a second axis of moment Y1 extending in this same cross section, this second axis of moment Y1 being perpendicular to said first axis of moment X1 of this cross section (in this instance for any cross section St in a given leaf spring plane, this second axis of moment Y1 is parallel to the air-gap plane P1 and perpendicular to the loop plane P2).

This is obtained by using leaf springs of which the respective cross sections each have a maximum thickness of section St measured in a direction perpendicular to the loop plane P2 that is strictly less than a minimum width of section St measured in a direction parallel to said air-gap plane P1 and said loop plane P2.

This leads to a translational movement of the armature that at the same time limits the tension/stresses exerted on these springs because they are fixed to the stator at just one end, the ends of the springs that are distant from the stator being simply able to move with the armature.

Limiting the maximum level of tension exerted in the springs and controlling the stiffness of the suspension system through the design of the springs by spreading the stresses over the entire length make it possible to limit the wearing of the springs, thereby increasing the service life of the machine.

The efficiency of the machine M1 is thereby improved.

As illustrated in FIGS. 1A and 1B, two actuating rods Ta1, Ta2 are connected to the mobile armature, these rods extending parallel to one another and in a common direction that is perpendicular to the first-loop plane P2. To limit the effects of unwanted bending, each of these rods Ta1, Ta2 is oriented opposite one of the leaf springs R1, R2 that corresponds to it.

Alternatively, it is possible to have a single actuating rod extending from the mobile armature and adopting a direction perpendicular to the first-loop plane P2. This single rod is fixed in a plane of symmetry of the armature. This embodiment makes it possible to limit the mobile mass of the electromagnetic machine but it is more sensitive to pivoting forces than are the two rods illustrated in FIGS. 1A, 1B, 2, 6 and 8*b*.

Figure 2:
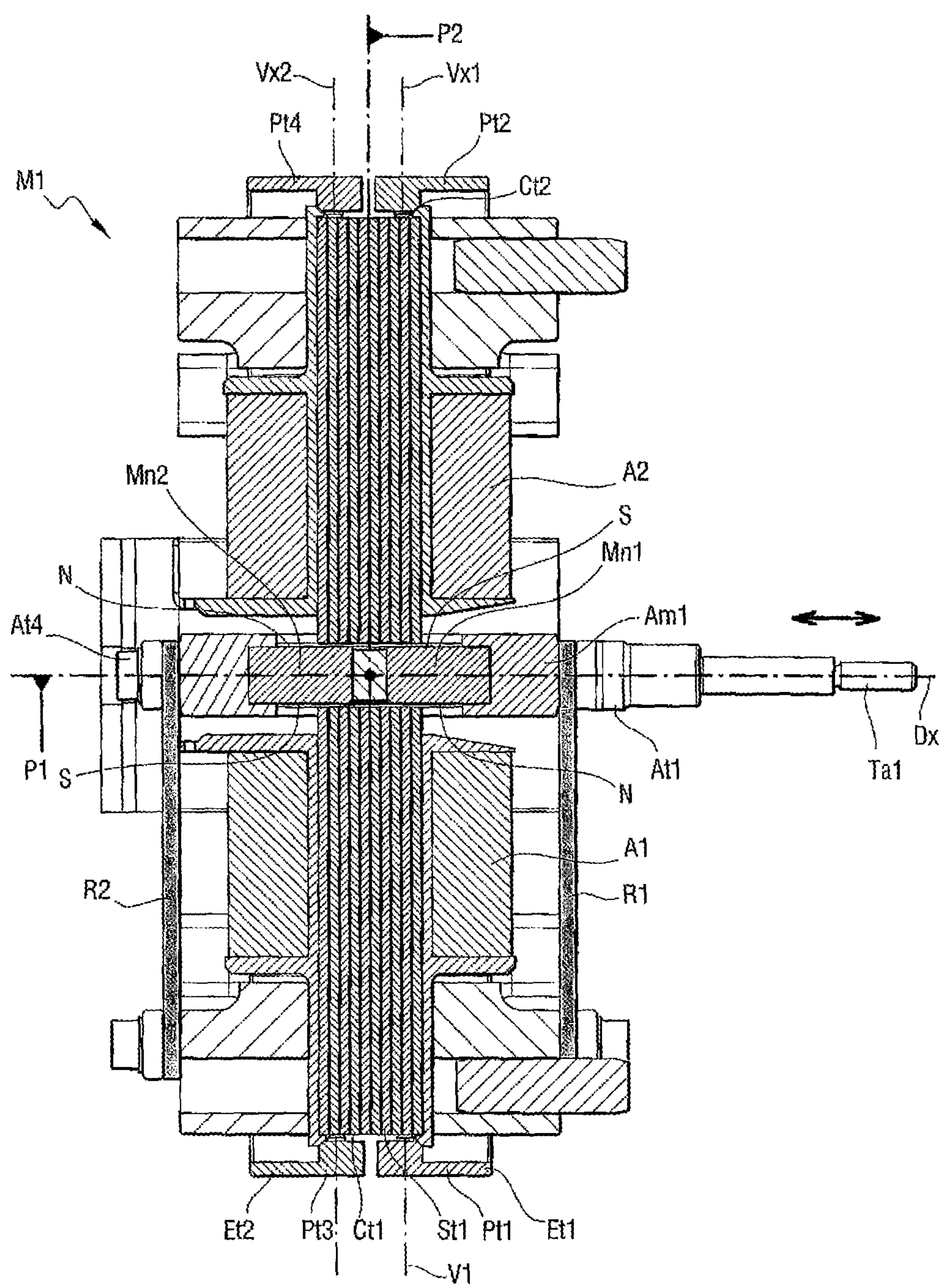
FIG. 2 is a view in section along a transverse plane II-II of the machine of FIG. 1A showing the two wound coils at two distinct points on the first magnetic core to induce a magnetic flux through the air gap or on the other hand to generate an electrical signal in response to a variation in flux in this air gap.

As can be seen in FIG. 1B and FIG. 2, the mobile armature comprises a frame enclosing the permanent magnets Mn1, Mn2 in this frame while forming an open window on either side of this frame. Advantageously, the magnets may be overmolded on this frame in order to form just one large moving part, or this frame may be molded in a magnetic material, then magnetized only in the regions customarily occupied by the magnets by the passage of a strong magnetic field, so as to create these two permanent magnetizations totaling two pairs of magnetic poles that are inverted relative to one another.

The benefit of this opening can be understood from FIG. 2 because the terminal ends of the first and second loops can be positioned right into the window so as to come as close as possible to the poles of the magnets Mn1, Mn2, thus improving the efficiency of the machine M1.

The mobile armature preferably comprises a magnet spacer arranged between the magnets to keep them apart.

This spacer is made from any nonmagnetic material, advantageously the same material as the magnet frame/support.

Thus, the magnet frame and/or spacer is/are preferably made from a material chosen from the group of materials comprising a polymer, polyacetal (Delrin®), acrylonitrile butadiene styrene (ABS), polyether ether ketone (PEEK), polyamide (PA6, PA66, PA12), filled with glass fibers or beads.

The magnets borne by the mobile armature Am1 comprise first and second magnets Mn1, Mn2.

The first magnet Mn1 has a north polarity N oriented toward the first terminal end of the first loop B and a south polarity S oriented toward the second terminal end of the first loop B and the second magnet Mn2 having a south polarity S oriented toward the first terminal end of the first loop B and a north polarity N oriented toward the second terminal end of the first loop B.

Each of said first and second magnets has an individual length, an individual thickness and an individual width, each of these first and second magnets extending along its length parallel to said air-gap plane (P1) and to said first-loop plane (P2).

Thus, the length of the magnets is perpendicular to the direction of translational movement of the mobile armature guided by the plurality of leaf springs.

Ideally, each of the leaf springs R1, R2, R3, R4 of the plurality of leaf springs extends widthwise and lengthwise in a main plane Pp of this given spring, this main plane Pp of this given spring being perpendicular to said air-gap plane P1.

In other words, the leaves of these springs are planar when the machine is at rest and they bend as the mobile structure moves.

Through this arrangement, at each instant of the movement of the mobile armature with respect to the stator, each of the leaf springs is essentially stressed in bending about directions of bending that are mutually parallel and parallel to the air-gap plane P1 and first-loop plane P2.

According to this embodiment, steps can be taken to ensure that the given springs of the plurality of given springs are mutually identical and arranged in such a way that their main planes Pp are mutually parallel when the machine is at rest.

Thus, as illustrated in FIG. 2, with reference to FIGS. 3*b*1 to 3*b*3, all the leaf springs of the plurality of leaf springs are deformed identically when the mobile armature moves relative to the stator. At each instant of this movement:

- the mobile armature Am1 is able to move only in a direction of translational movement Dx extending in a plane P3 perpendicular to the air-gap plane P1 and to the loop plane P2; and
- the mobile armature Am1 remaining always oriented in the same way with respect to the air-gap plane P1.

Given the orientations of the plurality of leaf springs, the possibilities for movement of the mobile armature Am1 with respect to the stator and in a transverse direction parallel to the first-loop plane P2 and to the air-gap plane P1 are particularly low, which is to say less than one thousandth of the possible movements of the mobile armature Am1 with respect to the stator and in the direction of translational movement Dx. Thus, the movements of the mobile armature in a direction parallel to the air-gap plane P1 and to the first-loop plane P2 are considered as being prevented.

Parasitic movements transverse to the plane P3 and parasitic rotations of the mobile armature about axes perpendicular to the plane P3 are thus prevented.

Once again, this preventing of parasitic movements and rotations limits the loss of efficiency induced by parasitic vibratory effects.

According to this embodiment, illustrated in particular by FIG. 2, steps are preferably taken to ensure that the respective individual lengths L of the springs of the plurality of springs extend longitudinally in the one same direction D perpendicular to the air-gap plane P1.

In this embodiment, each given leaf spring of said plurality of leaf springs extends longitudinally from its first end as far as its second end, these first and second ends constituting longitudinal ends L of this given spring.

Alternatively, as illustrated in FIG. 3*a*, each given leaf spring of said plurality of leaf springs may extend widthwise from its first end as far as its second end, these first and second ends constituting lateral ends of this given spring (as opposed to the longitudinal end). The length L of this given spring may also be parallel to the air-gap plane P1.

It is also possible for the leaves of the springs to be curved, each curved leaf being curved along a longitudinal direction of this leaf.

Likewise, it is possible for at least some of said leaves to undergo finishing treatments to reduce their sensitivities to fatigue during use of the motor. For that purpose, at least some of said leaves may have external surfaces that have been polished and/or peened (shot-peened) and/or micro-peened, for example using a laser (laser-peened). The micro-peening improves the fatigue strength of the peened leaves.

In one preferred embodiment, the connecting device R0 comprises air-gap-adjustment equipment comprising a plurality of first adjusting pieces (in this instance a plurality of first pins G1). At least some of the leaf springs R1, R2, R3, R4 have a first recess into which one of said first adjusting pieces G1 penetrates to prevent a relative movement between this given leaf spring and said stator in at least one direction of movement D perpendicular to said air-gap plane P1.

Thus, each of the first adjusting pieces is fixed to the stator to prevent any movement of the spring in at least one direction D perpendicular to the air-gap plane P1.

The smaller the air-gap clearance between the mobile armature and a terminal end of the first loop, the better the performance of the electromagnetic machine in terms of the efficiency with which it converts electrical energy into mechanical energy, or vice-versa.

Thus, by limiting the risk of a given leaf spring moving with respect to the stator in a direction perpendicular to the air-gap plane, the risk of the mobile armature rubbing against the stator, and therefore the risk of the efficiency of the machine varying in an uncontrolled manner, are limited.

As a preference, the air-gap clearance measured between a magnet of the mobile armature and a terminal end of the first loop or of the second loop is always below 1.5 mm, and preferably equal to or less than 0.5 mm between a magnet face, these air-gap clearances being preferably equal to one another give or take 30% of the value of the largest air-gap clearance of these air-gap clearances. Of course, these values may differ according to the dimensions of the electrical machine according to the invention.

Advantageously, the stator has dampers between it and the place where it is attached (for example its housing or its feet) to prevent the spread of vibrations, which is a source of noise. It is also possible for the stator to be placed inside a housing, and possibly for sound insulation to be arranged on the internal face of the housing of the machine to contain the noise inside the housing. A gasket on which this housing rests may also be added, in order to provide sound insulation between the inside and the outside of the housing.

In one preferred embodiment, the air-gap-adjusting equipment R0 comprising a plurality of second adjusting pieces (in this instance a plurality of second pins G2 visible in FIG. 1B). At least some of the leaf springs have a second recess into which one of said second adjusting pieces G2 penetrates to prevent a relative movement between this given leaf spring and said mobile armature Am1 in at least one direction of movement D perpendicular to said air-gap plane P1.

Each of the second adjusting pieces G2 is fixed to the mobile armature Am1.

Thus, by limiting the risk of a given leaf spring moving with respect to the stator St1 and with respect to the mobile armature Am1 in a direction D perpendicular to the air-gap Etf plane, the risk of the efficiency of the machine varying in an uncontrolled manner is further limited.

As illustrated in FIGS. 1A and 2, the stator comprises first and second calipers Et1, Et2 (each U-shaped) arranged on either side of said first loop B1. The first caliper Et1 pressing against a first face of the first loop B1 and the second caliper Et2 pressing against a second face of this first loop B1. These first and second faces of the first loop B1 extending on either side of the first loop and being respectively parallel to said first-loop plane P2.

Each of these first and second calipers Et1, Et2 bearing adjustable lateral packing pieces V1, V2, Vx1, Vx2.

The adjustable lateral packing pieces of the first caliper Et1 butting respectively against first and second mutually opposite lateral peripheral sides Ct1, Ct2 of the first loop to laterally position this first caliper Et1 facing the first loop B to oppose the slippage of this first caliper Et1 along the first face of this first loop in a direction of slippage D perpendicular to said air-gap plane P1.

The adjustable lateral packing pieces of the second caliper Vx2 butting respectively against said first and second mutually opposite lateral peripheral sides Ct1, Ct2 of the first loop B to laterally position this second caliper Et2 facing the first loop while opposing the slippage of this second caliper along the second face of said first loop and in said direction of slippage D perpendicular to said air-gap plane P1.

It will be noted that the lateral packing pieces of the first caliper Et1 comprise:

- a first pair of lateral lugs Pt1 extending opposite a part of said first lateral peripheral side Ct1 of the first loop B; and
- a second pair of lateral lugs Pt2 extending opposite a part of said second lateral peripheral side Ct2 of the first loop B; and
- each given lateral lug Pt1, Pt2 of the first caliper bearing an adjusting screw V1, V2 which is threaded on this given lateral lug so as to come into abutment against the peripheral side opposite which this given lug V1, V2 extends.

Likewise, the lateral packing pieces of the second caliper comprise:

- a first pair of lateral lugs Pt3 extending opposite a part of said first lateral peripheral side Ct1 of the first loop B; and
- a second pair of lateral lugs Pt4 extending opposite a part of said second lateral peripheral side Ct2 of the first loop B; and
- each given lateral lug Pt3, Pt4 of the second caliper Et2 bearing an adjusting screw Vx2 which is threaded on this given lateral lug so as to come into abutment against the peripheral side Ct1, Ct2 opposite which this given lug extends.

Thus, by screwing the threaded screws V1, V2, Vx1, Vx2 into or out of the lugs of the calipers, each caliper is positioned precisely with respect to the first loop and thus the air-gap clearances formed on each side of the mobile armature Am1, between this side of the mobile armature and the end of the first loop facing it, are determined.

It should be noted that once the first and second calipers Et1, Et2 are correctly positioned opposite the first loop B, a resin can be applied to cover all or part of these calipers and to permanently bond them against the first loop.

The coating of the stator with the resin can also be used to avoid vibrations, problems with insulation, and to improve the dissipation of heat from the machine, as well as the electrical safety of the system.

It is also possible to use, in order to form the magnetic core, heat-seal laminations and/or a heat-seal coil. Insulating resins or lacquers may be used to surround the coil or coils in order to provide protection to prevent the turns from wearing as a result of vibration. In that case, all that is required is for the machine to be assembled and then heated in order to cause the laminations to bond together and/or the coil or coils to bond to the laminations.

Each leaf spring R1, R2, R3, R4 may be fixed to the stator St1, and more particularly to one of the calipers Et1, Et2 which corresponds to it using through-rods T1, T2 which in this instance are screws. These tie-bolt screws T1, T2 are threaded so as to clamp the spring firmly onto the stator and more particularly onto one of the corresponding calipers.

In the embodiment in which pins G1, G2 are used for positioning the given leaf spring against the stator, it is possible to make provision for the through-rods T1, T2 to be tightened after this spring has been prepositioned using the corresponding pin. Thus, each given spring of the plurality of springs R1, R2, R3, R4 can be fixed to the stator via a positioning pin which corresponds to it and via two clamping rods T1, T2 which correspond to it and which are threaded into drillings made in the stator.

In these embodiments in which use is made of the first and second calipers Et1, Et2, provision may be made for said first adjusting pieces, namely the pins G1, that enter the first recesses in the leaf springs, to be secured to the stator by being fixed to one of the calipers that corresponds to it.

Thus, each given leaf spring is immobilized in the direction of travel D with respect to the stator:

- by virtue of a pin G1 extending between the caliper and the corresponding spring to which this given leaf spring is fixed; and
- by virtue of means for fixing this caliper to the first loop B.

It will be noted that the means for fixing the calipers to the first loop comprise clamping bolts Bx visible in FIG. 1A. These bolts Bx have a peripheral clearance with respect to said caliper or calipers through which they pass, so as to allow the position of these calipers with respect to the first loop B to be adjusted.

As a preference, as illustrated in FIGS. 1A, 1B, said plurality of leaf springs comprises first and second pairs of leaf springs R1, R2, R3, R4, the first pair of leaf springs R1, R3 being on one side of said loop B plane and the second pair of leaf springs R2, R4 being on the other side of this loop B plane.

Having two pairs of springs rather than just a single pair of springs makes it possible to limit the risk of the mobile armature becoming detached in the event of one of the springs breaking.

The springs of the first pair of springs may be arranged on either side of the first coil A1 and the springs of the second pair of springs may be arranged on either side of the first coil, allowing a space saving.

The leaf springs of the first pair of leaf springs R1, R3 are placed at the respective ends of a first edge Bd1 of the mobile armature which extends parallel to and some distance from the first-loop plane P2 and the leaf springs of the second pair of leaf springs R2, R4 are placed at the respective ends of a second edge Bd2 of the mobile armature which extends parallel to and some distance from the first-loop plane P2. These first and second edges Bd1, Bd2 of the mobile armature are arranged on either side of the first-loop plane P2 and parallel to the loop plane P2, each of these edges Bd1, Bd2 extending in a direction of extension that is specific to it and that is parallel to said air-gap plane P1.

By arranging the springs of the pairs of leaf springs at the respective ends of the first and second edges of the mobile armature Am1, an effect of preventing the mobile armature from rotating about an axis of orientation perpendicular to the air-gap plane P1 is increased.

More particularly, the connections of the leaf springs are connected to the mobile armature via peripheral fasteners At1, At2, At3, At4 fixed respectively to the corners of the mobile armature Am1, at less than ¼ along the edge with respect to the length of the first and second respective edges Bd1, Bd2 of the mobile armature.

Figure 4:
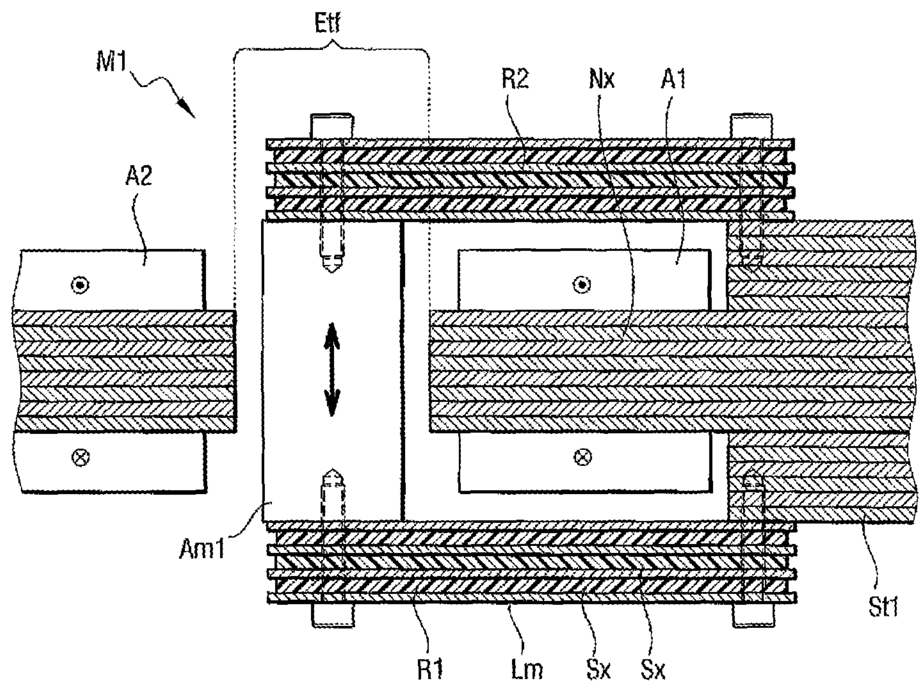
FIG. 4 illustrates an embodiment of the leaf springs in which it can be seen that the leaves of one same leaf spring are mutually separated by leaf separators arranged to allow the leaves of one same spring to slip against one another.

As illustrated in FIG. 4, each of the leaf springs of the plurality of leaf springs may comprise several leaves. This allows the bending stiffness of a spring to be adjusted in a simple way by removing or adding a leaf to the spring, so as to modify the resonant frequency of the motor. Another advantage is that the stresses are spread over several low-stiffness springs rather than over a single high-stiffness leaf spring which might carry the risk of breaking too soon.

In this embodiment, the leaves are mutually separated by leaf separators Sx arranged to allow slippage of these leaves of the spring against external slip faces of these leaf separators.

These leaf separators Sx make it possible to avoid direct contact between leaves in order to limit the noise and heating between the leaves as the machine is in operation. In another embodiment, these separators may be present only on the fixing regions of the springs rather than over their entire length.

According to the embodiments of FIGS. 1A, 1B, at least some of said leaves of the plurality of leaf springs R1, R2, R3, R4 are perforated, each perforated leaf having at least one perforation R1*x* passing through the leaf so as to have, on each side of the perforation R1*x*, two leaf-bending zones which are elongate.

Having two elongate and separated bending zones per leaf makes it possible to limit the risk of complete breakage of a given leaf while at the same time limiting its mass and its windage as it moves. This also makes it possible to distribute the bending stresses over the entire surface area of the spring, rather than keeping them locally close to the fixing zones. The durability of each leaf spring is thus improved. The efficiency of the machine is once again improved. It is also possible for one same leaf to have several perforations to define favored zones for bending stresses of the leaf and favored curvatures of deformation of the leaf in bending.

The operation of the electromagnetic machine according to the invention will now be explained with reference to FIGS. 3*a*, 3*b*1, 3*b*2, 3*b*3.

In FIG. 3*b*1, a low-intensity current is generated in the coils. The force of this current is too low to induce a pronounced movement of the armature, which therefore remains in the position of rest.

Then, in FIG. 3*b*2, the intensity of the current is increased in comparison with FIG. 3*b*1 and the flux induced in the air gap is enough to have, on one side of the air gap, a north pole N and, on the other side, a south pole S. Because the permanent magnets have the opposite polarities, it may be seen that a north pole N of the first magnet is oriented toward the first terminal end of the first loop whereas it is the south pole S of the second magnet that is oriented toward this same first end.

Conversely, the south pole of the first magnet is oriented toward the second terminal end of the first loop whereas it is the north pole of the second magnet that is oriented toward this same second end.

The result is that, under the effect of the flux in FIG. 3*b*2, a transverse force that shifts the mobile armature in a first direction while at the same time causing a bending of the leaf springs that opposes this movement in this first direction.

In FIG. 3*b*3, the magnetic flux passing through the air gap is reversed under the effect of a commutation of current in the coils. This results in a transverse force that shifts the mobile armature in a second direction while at the same time causing a bending of the leaf springs that opposes this movement in this first direction.

It may be seen that by reversing the magnetic fluxes in the opposite directions S1 then S2, by a commutation of current in the coils, an alternating movement of the armature with respect to the support is generated, the springs exerting a return force which, at certain frequencies, amplifies the efficiency of the motor.

It should be noted that in the generator mode it is the reciprocating movement of the armature that induces the current in the coils.

Various possible improvements to the motor according to the invention are listed hereinafter.

In order to avoid motor runaway and excessively large amplitudes of the mobile part with respect to the stator, end stops may be added. As a preference, these end stops are flexible. They may advantageously be positioned above and below the mobile armature (magnet support), or else under each spring and for example fixed to the resin.

In the instance in which the electromagnetic machine is a motor, this motor is controlled by power electronics that supply a periodic alternating signal.

Advantageously, in "motor" operation, this machine is powered by control electronics generating the desired signal for the movement of the mobile part.

Advantageously, these electronics supply a periodic alternating signal.

Advantageously, these electronics are encapsulated in the resin and/or secured to the stator.

Advantageously, the electronics are powered by a DC or AC network (in the latter case the power is rectified), then supply a voltage to the terminals of the machine to which the terminals of the coils that may be connected in series or in parallel are connected so as to generate the desired movement.

Advantageously, these electronics are chopping electronics (FIG. 9) comprising an inverter powered by the AC network, filtered or unfiltered upstream or downstream of the inverter of the inverter, rectified or not rectified upstream or downstream of the inverter, possibly filtered again upstream or downstream of the inverter. These electronics can be inverted using an H-bridge (an inverter employing transistors for example of the MOSfet, IGBT, bipolar, graphene type) in the form of a PWM (pulse width modulated) voltage.

Advantageously, these electronics allow the frequency of oscillation of the movement and the amplitude of movement to be varied using the voltage.

Advantageously, for systems requiring manual control, the control of the power is achieved using a rotary knob that acts like a "variator", able either to vary only the frequency, to vary only the voltage, or to vary both at the same time.

Advantageously, the motor comprises closed-loop control of the movement of the mobile part using feedback from a sensor.

This sensor may be a displacement, position, speed, acceleration, current sensor or any type of sensor that allows the position of the mobile armature relative to the stator to be deduced.

Advantageously, the control electronics controlling the motor are programmed to execute vector control of the motor.

The sensor may be situated, for example, either on the stator or on the mobile armature or another mobile part, or on the electronics in the event that it is an electrical quantity that is being measured.

It is also possible for the control electronics to comprise means of communication with the outside of the equipment external to the machine M1.

In that case, the power electronics may be controlled remotely in an automated or non-automated manner. In order to do that, use may be made of the Industrial Internet of things (IIoT).

Advantageously, these control electronics communicate with control electronics of another electromagnetic machine M2 of this invention, so as to synchronize the frequency and/or the amplitude of the two mobile parts, either in phase or otherwise.

Figure 5A:
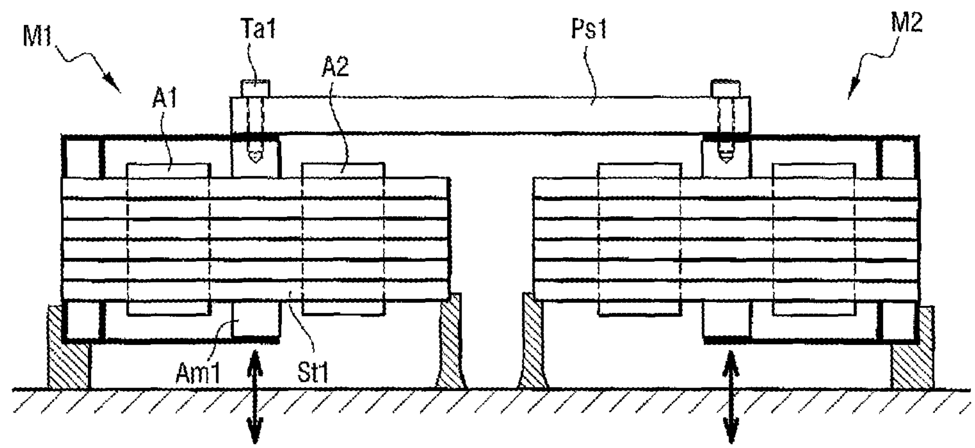
FIG. 5*a* illustrates two electromagnetic machines according to the invention coupled to one another by a securing piece Ps1 fixed on the one hand to the mobile armature of the first machine M1 and on the other hand to the mobile armature of the second of these machines M2, these machines here are coupled in opposition with the stator/leaf-spring connections arranged on either side of this assembly of coupled machines; in this mode, when the machines have synchronized movements, the connecting piece Ps1 is then stressed in tension with the increase in the amplitude of oscillation, and the effect of synchronization between these machines is thus enhanced.
Figure 5B:
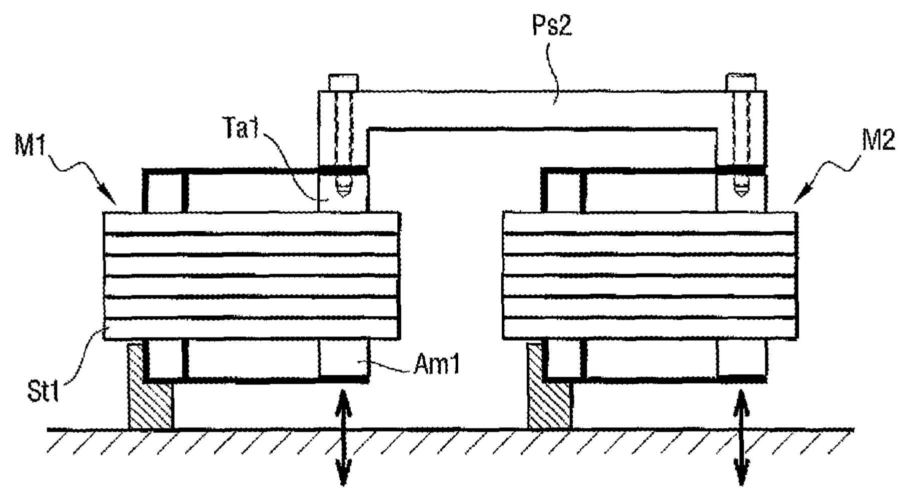
FIG. 5B also illustrates two electromagnetic machines M1, M2 according to the invention coupled to one another by a securing piece fixed on the one hand to the mobile armature of the first machine and on the other hand to the mobile armature of the second of these machines, these machines here are coupled in parallel; in this mode, when the machines are synchronized and the armatures effect a translational movement together, the connecting piece then undergoes a translational movement of the same amplitude without being subjected to the traction because of a separation of the armatures; this embodiment limits the loss of efficiency because the securing piece Ps2 is subjected to less tensile stress.
Figure 6:
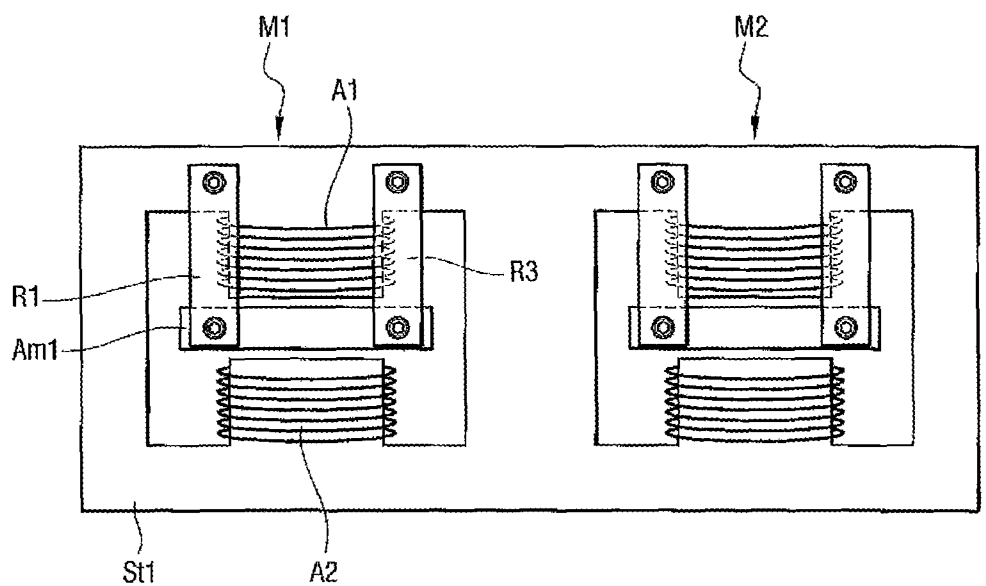
FIG. 6 illustrates another way of coupling two electromagnetic machines according to the invention to form an assembly of machines; in this instance, the stators of these machines are joined together because they share the one same stator piece that forms the first magnetic cores of the machine/stator; this then limits the vibrations between these machines and above all promotes the coupling of the movements of the armatures.

In that case, as in FIGS. 5A, 5B, 6, the at least two electromagnetic machines M1, M2 may have their respective mobile armatures secured to one another or not, by a piece Ps1, Ps2, according to whether preference is being given to synchronizing these mobile armatures or, on the other hand, to not synchronizing these mobile armatures the mobile parts of which are joined together (FIGS. 5A, 5B).

This may be of benefit in order, for example, to increase the force transmitted to the piece Ps1, Ps2 for the same amplitude of movement.

Advantageously, the controls of the machines communicate with one another in order to match their oscillations.

Advantageously, the control electronics may drive several machines of this invention.

It is also possible to have at least two electromagnetic machines M1, M2 the stators of which are joined together (FIG. 6).

In this embodiment:

- Advantageously, the controls of the machines communicate with one another in order to match their oscillations.
- Advantageously, the stators and the mobile armatures are joined together, in order to increase the force transmitted and to reduce the size of the machine into a single system.
- Advantageously, the mobile parts operate at the same frequency, but in phase opposition, in order to eliminate the imbalance caused by the oscillations.

Figure 7:
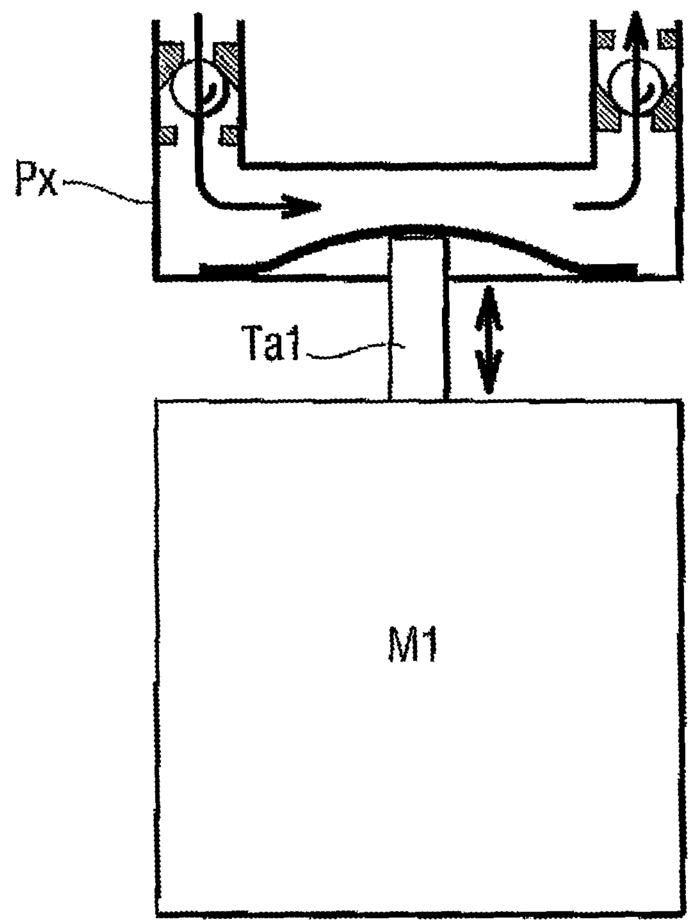
FIG. 7 illustrates a pumping assembly comprising an electromagnetic machine M1 according to the invention and a circulator Px comprising a circulator body defining a chamber extending between two nonreturn valves mounted in such a way as to allow fluid to circulate from a circulator inlet toward a circulator outlet while preventing the reverse, a diaphragm for varying the volume of the chamber as a function of a reciprocating oscillatory movement of an actuating rod Ta1 belonging to the electromagnetic machine according to the invention which in this instance is a motor.

As illustrated in FIG. 7, the electromagnetic machine may be connected to at least one fluid transfer system.

This embodiment can be used for blending, mixing, stirring, for any type of fluid transfer (pumps, blowers, compressors, impellers), any type of fluids (liquids, gases, powders, foams, mud, granules and other fluidizable substances, fragile liquids such as blood or living cells, etc.) using transfer via a piston, a ripple diaphragm, a conventional diaphragm (of the "diaphragm pump" type), these examples being nonlimiting.

Figure 8A:
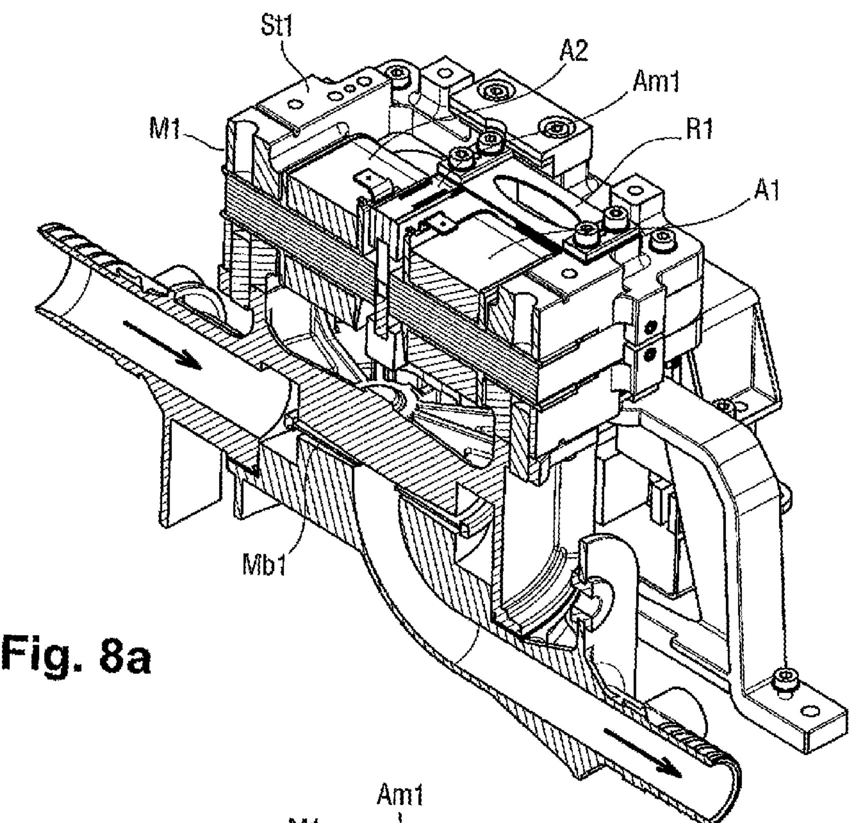
FIG. 8*a* is a view in section of a circulator assembly according to the invention comprising an electromagnetic machine, in this instance a motor according to the invention, and a ripple-diaphragm circulator body of which the diaphragm is arranged in a body in which it passes a ripple between a circulator inlet and a circulator outlet and thus generates a flow of fluid through this circulator.
Figure 8B:
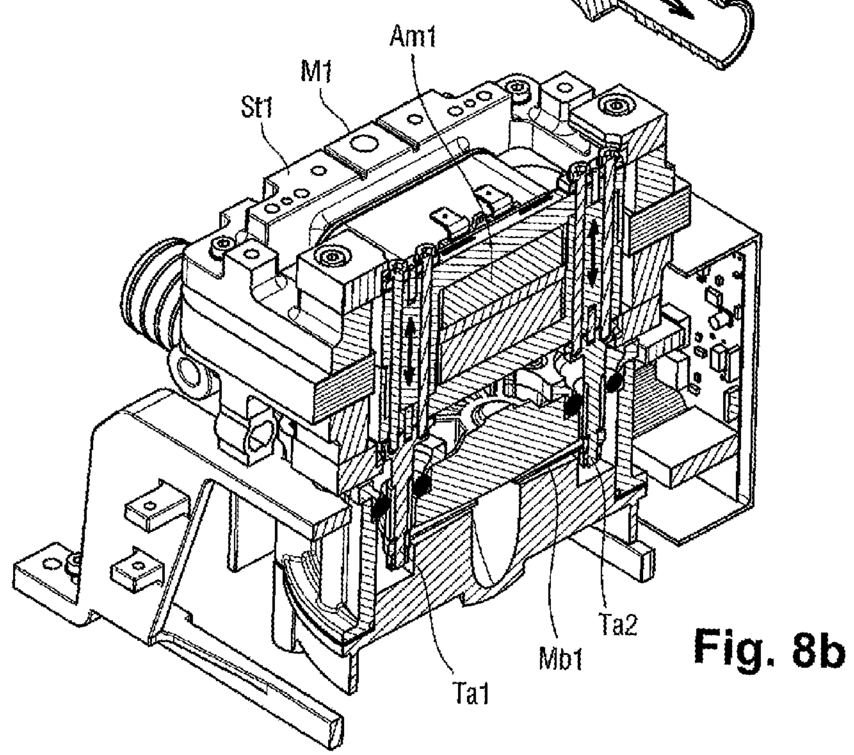
FIG. 8*b* also illustrates the circulator assembly of FIG. 8*a* but in a plane of section perpendicular to that of FIG. 8*a*. Here, the external edge of the diaphragm Mb1 is connected to two mutually parallel actuating rods Ta1, Ta2 which are themselves fixed to the mobile armature from which they extend to drive, in a transverse movement, the external edge of the diaphragm and thus induce a ripple which travels along this diaphragm Mb1 to cause the fluid to circulate.

As illustrated in FIGS. 8*a* and 8*b*, a system for transferring fluid using a ripple diaphragm may be connected to the electromagnetic machine according to the invention.

The assembly illustrated in FIGS. 8*a*, 8*b* can be used for any type of transfer: pumping/ventilation/compression/propulsion.

Advantageously, the circulator may be in the form of a discoidal ripple diaphragm pump, for liquids or fluidizable substances.

The various advantages of this structure are: self-priming, controllable or continuous throughput pulsing, reduced shear, increased effectiveness, sealing, etc.

Advantageously, the motor is insulated from the head of the circulator by sealing gaskets and/or boots.

Another embodiment consists in coupling two ripple-diaphragm circulators to the mobile armature, for example via the rods Ta1, Ta2 or a connecting piece Ps1, Ps2 extending between the respective armatures of two motors according to the invention, as in FIGS. 5A, 5B.

Another embodiment involves fixing together two circulators of the invention, the oscillations of which occur at the same frequency but out of phase, so as to eliminate the imbalance caused by the oscillatory movements.

Another embodiment consists in placing such circulators in series, in order to increase the hydraulic power of the fluidic circuit.

Advantageously, this circulator operates off a sinusoidal voltage, the frequency of which may extend from 50 to 450 Hz, taken directly off the network on which it is installed, or obtained using chopping electronics and/or a transformer.

Advantageously, there is a deflector in the chamber upstream and/or downstream of the ripple diaphragm.

The mobile armature of the motor according to the invention can also be coupled to a working tool.

Such a tool may be a cutting, piercing, percussion tool, a tool generating vibration (vibrator) or anti-vibration, for sorting elements (by attaching a sorting plate), for endurance testing in vibration, elongation, frequency.

The machine according to the invention may also be used as a measurement instrument for measuring parameters derived from a linear movement of the mobile part (position, speed, acceleration, frequency).

The machine according to the invention may also operate in electricity generator mode. In that case, the mobile armature is connected to a vibration source.

Advantageously, the vibrations of the source are at a frequency situated in the passband of the machine, so as to improve the energy recovery thereof.

Advantageously, this energy is recovered by chopping electronics which may be the same electronics that generate the movement during motor operation.

Advantageously, this energy generator is powered by the vibrations of a ripple diaphragm used to pump a fluid when the electromagnetic machine is operating in motor mode, and to recover the energy of the passing of a fluid through the head of the circulator in the opposite case. The fluid being able to generate energy whatever the direction in which it flows in the head of the circulator. This potentially allowing other functions of the circulator such as, for example: the spot reading of the flow rate passing through the circulator head by analyzing the energy generated during this short moment.

The motor according to the invention, when it is operated with DC voltage, constitutes a very precise linear motor with a continuous movement, which means to say without steps liable to form discontinuities in a curve of translational movement.

On the other hand, if powered with alternating current or commuted current, what is generated is an oscillatory movement, possibly reasoning, so as to amplify the motive power compared with the electrical power actually supplied. This alternating current can be centered on zero or off-centered and contain a current offset, so as for example to off center the mobile part with respect to its state of rest, or simply to recenter it about that state.

The machine according to the invention may be suitable for application in various domains such as water treatment, the food, pharmaceutical, chemical, medical, aeronautical, space, petrochemical, agricultural, nuclear, power-generation, paper, marine industries and the like, nonlimitingly.

In one particular embodiment of the invention, at least some of the springs of the plurality of leaf springs are connected to the mobile armature by fasteners placed at the ends of the first edge Bd1 of the mobile armature which extends parallel to and some distance from the first-loop plane P2, in a direction of extension extending parallel to said air-gap plane P1.

In one particular embodiment of the invention, the machine may comprise a generator of a signal supplying said at least one first coil such that the mobile armature oscillates with respect to the stator with a frequency of oscillation comprised between 45 Hz and 450 Hz, this frequency of oscillation being equal, to within plus or minus 20%, to a resonant frequency of a mobile assembly able to move with respect to the stator, this mobile assembly comprising at least said plurality of leaf springs and said mobile armature.

Operating at resonance or close to the resonant frequency makes it possible to increase the energy efficiency of the machine according to the invention.

In one particular embodiment of the invention, the plurality of leaf springs has a total elastic stiffness such that said elastic return force returning the mobile armature toward its position of rest adopts a maximum force value comprised between 5 N and 500 N when the mobile armature is moved by a distance of at most 2 mm with respect to said position of rest of the armature.

This high stiffness of the springs makes it possible to have a frequency of operation that is high with an amplitude of movement that is particularly low.

In one particular embodiment of the invention, the machine comprises a generator of a supply signal designed to automatically control the movement of the mobile armature with respect to the stator according to a setpoint signal.

In one particular embodiment of the invention, the machine comprises at least one fluid circulator, the stator being attached to at least one body of the fluid circulator, said mobile armature being attached to at least a fluid transfer means positioned inside said at least one circulator body, this fluid transfer means being arranged so that in response to an actuation of the motor this fluid transfer means transfers a fluid from a fluid inlet of said at least one fluid circulator body to a fluid outlet of this at least one fluid circulator body.

According to this embodiment, there may be two fluid circulators each provided with its own individual transfer means, each of these transfer means being connected to said mobile armature. For example, one of these transfer means can be connected to the mobile armature on one side of this mobile armature while the other of these transfer means can be connected to the mobile armature on another side of this mobile armature.

In one particular embodiment of the invention, said at least one fluid circulator is a ripple-diaphragm fluid circulator of which the diaphragm is a fluid transfer means able to pass a ripple from a diaphragm upstream edge attached to the mobile armature to a downstream edge of the diaphragm.

In one particular embodiment of the invention, the machine comprises a tool attached to the mobile armature so as to be actuated by movement of the mobile armature with respect to the stator, this tool being selected from the group of tools comprising a cutting tool, a percussion tool, a piercing tool, a vibration-transmitting tool, a vibration-attenuating tool, a tool that measures physical parameters of a workpiece that is to be tested subjected to the movement of said mobile armature.

In one particular embodiment of the invention, the invention relates to an assembly comprising several machines according to any one of the embodiments described hereinabove, the mobile armatures of these machines being connected to one another to oscillate at the one same frequency.

These machines of the assembly may thus oscillate at the one same frequency by being, for example, in phase in order to increase the operating inertia, or in phase opposition in order to limit the vibratory disturbances and imbalance.

The invention claimed is:

1. An electromagnetic machine comprising a stator, a mobile armature able to move with respect to the stator and a mechanical connection device connecting the mobile armature to the stator, the connecting device comprising a plurality of leaf springs designed to suspend the mobile armature from the stator, each leaf spring comprising at least one elastic leaf that is deformable in bending, the stator comprising at least a first electric coil and at least a first magnetic core forming at least a first open loop between first and second terminal ends of the first loop so as to define an air gap between these terminal ends, the first coil being arranged around a portion of the first magnetic core, characterized in that said plurality of leaf springs extends on just one side of an air-gap plane, the air-gap plane being perpendicular to a first-loop plane in which the first loop extends, the air-gap plane being situated between said terminal ends of the first loop while at the same time being distant from these ends of the first loop, the mobile armature bearing permanent magnets, the machine being further characterized in that each given leaf spring of said plurality of leaf springs extends from a first end of the given leaf spring, which end is connected to said stator, as far as a second end of the given leaf spring, which end is connected to said mobile armature, at least one of said springs of the plurality of leaf springs being on one side of said loop plane and at least another of said springs of the plurality of leaf springs being on the other side of the loop plane, the plurality of leaf springs being arranged to generate an elastic return force returning the mobile armature toward a position of rest of the armature when said armature has undergone a translational movement with respect to said stator in a direction perpendicular to the loop plane and to prevent any movement of said mobile armature in a transverse direction comprised both in the air-gap plane and in the loop plane.

2. The machine as claimed in claim 1, in which the connecting device comprises air-gap-adjustment equipment comprising a plurality of first adjusting pieces, at least some of the leaf springs having a first recess into which one of said first adjusting pieces penetrates to prevent a relative movement between the given leaf spring and said stator in at least one direction of movement perpendicular to said air-gap plane.

3. The machine as claimed in claim 1, in which the connecting device comprises air-gap-adjustment equipment comprising a plurality of second adjusting pieces, at least some of the leaf springs having a second recess into which one of said second adjusting pieces penetrates to prevent a relative movement between the given leaf spring and said mobile armature in at least one direction of movement perpendicular to said air-gap plane.

4. The machine as claimed in claim 1, in which:

the stator comprises first and second calipers arranged on either side of said first loop, the first caliper pressing against a first face of the first loop and the second caliper pressing against a second face of the first loop, these first and second faces of the first loop extending on either side of the first loop and being respectively parallel to said first-loop plane, each of these first and second calipers bearing adjustable lateral packing pieces, the adjustable lateral packing pieces of the first caliper butting respectively against first and second mutually opposite lateral peripheral sides of the first loop to laterally position the first caliper facing the first loop to oppose the slippage of the first caliper along the first face of the first loop in a direction of slippage perpendicular to said air-gap plane, the adjustable lateral packing pieces of the second caliper butting respectively against said first and second mutually opposite lateral peripheral sides of the first loop to laterally position the second caliper facing the first loop while opposing the slippage of the second caliper along the second face of said first loop and in said direction of slippage perpendicular to said air-gap plane.

5. The machine as claimed in claim 1, in which at least some of the springs of the plurality of leaf springs are connected to the mobile armature by fasteners placed at the ends of a first edge of the mobile armature which extends parallel to and some distance from the first-loop plane, in a direction of extension running parallel to said air-gap plane.

6. The machine as claimed in claim 1, in which the mobile armature comprises a magnet spacer arranged between the magnets to keep them apart.

7. The machine as claimed in claim 1, in which at least some of said leaves of the plurality of leaf springs are perforated, each perforated leaf having at least one perforation passing through the leaf so as to have, on each side of the perforation, two leaf-bending zones which are elongate.

8. The machine as claimed in claim 1, comprising signal generation means generating a supply signal for said at least one first coil such that the mobile armature oscillates with respect to the stator with a frequency of oscillation comprised between 45 Hz and 450 Hz, the frequency of oscillation being equal, to within plus or minus 20%, to a resonant frequency of a mobile assembly able to move with respect to the stator, the mobile assembly comprising at least said plurality of leaf springs and said mobile armature.

9. The machine as claimed in claim 1, in which the plurality of leaf springs has a total elastic stiffness such that said elastic return force returning the mobile armature toward its position of rest adopts a maximum force value comprised between 5 N and 500 N when the mobile armature is moved by a distance of at most 2 mm with respect to said position of rest of the armature.

10. The machine as claimed in claim 1, comprising a generator of a supply signal designed to automatically control the movement of the mobile armature with respect to the stator according to a setpoint signal.

11. The machine as claimed in claim 1, comprising a tool attached to the mobile armature so as to be actuated by movement of the mobile armature with respect to the stator, the tool being selected from the group of tools comprising a cutting tool, a percussion tool, a piercing tool, a vibration-transmitting tool, a vibration-attenuating tool, a tool that measures physical parameters of a workpiece that is to be tested subjected to the movement of said mobile armature.

12. An assembly comprising several machines as claimed in claim 1, in which the stators of the several machines are connected to one another and the mobile armatures of the several machines are designed to oscillate at one same frequency.

13. The machine as claimed in claim 1, in which each of the leaf springs of the plurality of leaf springs extends widthwise and lengthwise in a main plane of the given spring, the main plane of the given spring being perpendicular to said air-gap plane.

14. The machine as claimed in claim 13, in which the given springs of the plurality of given springs are mutually identical and are arranged in such a way that their main planes are mutually parallel when the machine is at rest and in which the respective individual lengths of the springs of the plurality of springs extend longitudinally in the one same direction perpendicular to the air-gap plane.

15. The machine as claimed in claim 1, in which said plurality of leaf springs comprises first and second pairs of leaf springs, the first pair of leaf springs being on one side of said loop plane and said second pair of leaf springs being on the other side of the said loop plane.

16. The machine as claimed in claim 15, in which the leaf springs of the first pair of leaf springs are placed at the respective ends of a first edge of the mobile armature which extends parallel to and some distance from the first-loop plane and the leaf springs of the second pair of leaf springs are placed at the respective ends of a second edge of the mobile armature which extends parallel to and some distance from the first-loop plane, these first and second edges of the mobile armature being arranged on either side of the first-loop plane and parallel to the loop plane in a direction of extension.

17. The machine as claimed in claim 1, in which each of the leaf springs of the plurality of leaf springs comprises several leaves.

18. The machine as claimed in claim 17, in which the leaves of one same leaf spring are mutually separated by leaf separators arranged to allow slippage of these leaves of the spring against external slip faces of these leaf separators.

19. The machine as claimed in claim 1, in which said magnets borne by the mobile armature comprise first and second magnets, the first magnet having a north polarity oriented toward the first terminal end of the first loop and a south polarity oriented toward the second terminal end of the first loop and the second magnet having a south polarity oriented toward the first terminal end of the first loop and a north polarity oriented toward the second terminal end of the first loop.

20. The machine as claimed in claim 19, in which each of said first and second magnets has an individual length, an individual thickness and an individual width, each of these first and second magnets extending along its length parallel to said air-gap plane and to said first-loop plane.

21. The machine as claimed in claim 1, in which the mobile armature is suspended via the connecting device in such a way that the mobile armature (Am1) is positioned between said first and second terminal ends of said first open loop.

22. The machine as claimed in claim 21, in which said first open loop is configured to define at least a first flux path in the shape of a C, the terminal ends of the C-shape being respectively formed by the first and second terminal ends of said first open loop.

23. The machine as claimed in claim 1, comprising at least one fluid circulator, the stator being attached to at least one body of the fluid circulator, said mobile armature being attached to at least a fluid transfer means positioned inside said at least one circulator body, the fluid transfer means being arranged so that in response to an actuation of the motor the fluid transfer means transfers a fluid from a fluid inlet of said at least one fluid circulator body to a fluid outlet of the fluid circulator body.

24. The machine as claimed in claim 23, in which said at least one fluid circulator is a ripple-diaphragm fluid circulator of which the diaphragm is a fluid transfer means able to pass a ripple from a diaphragm upstream edge attached to the mobile armature to a downstream edge of the diaphragm.

* * * * *